July 16, 1935.  J. H. GRAYSON  2,008,547
SAFETY GAS VALVE
Filed Sept. 10, 1934   2 Sheets-Sheet 1
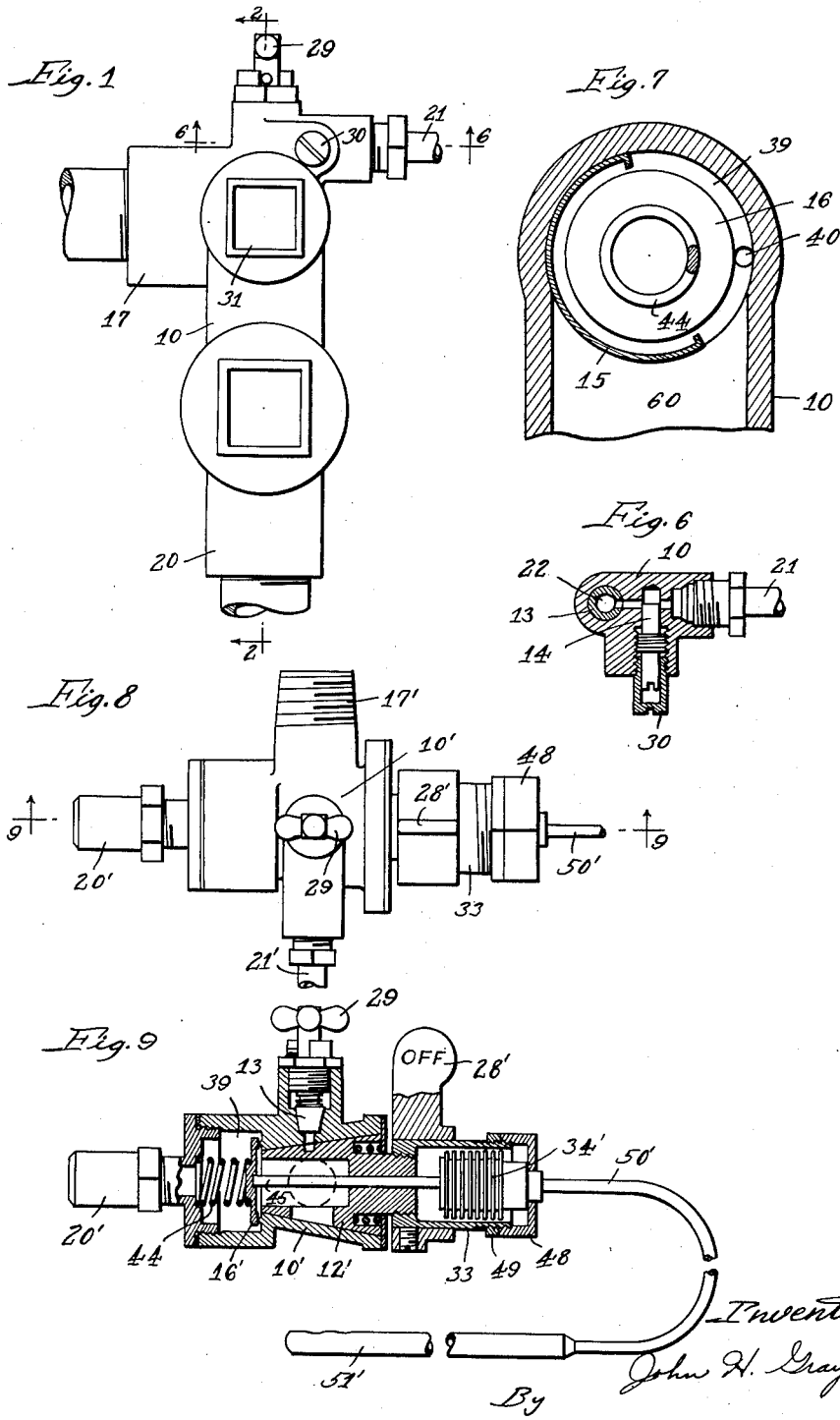
Inventor:
John H. Grayson
By
Wilson, Powell, McCanna & Wintercorn
Attys.

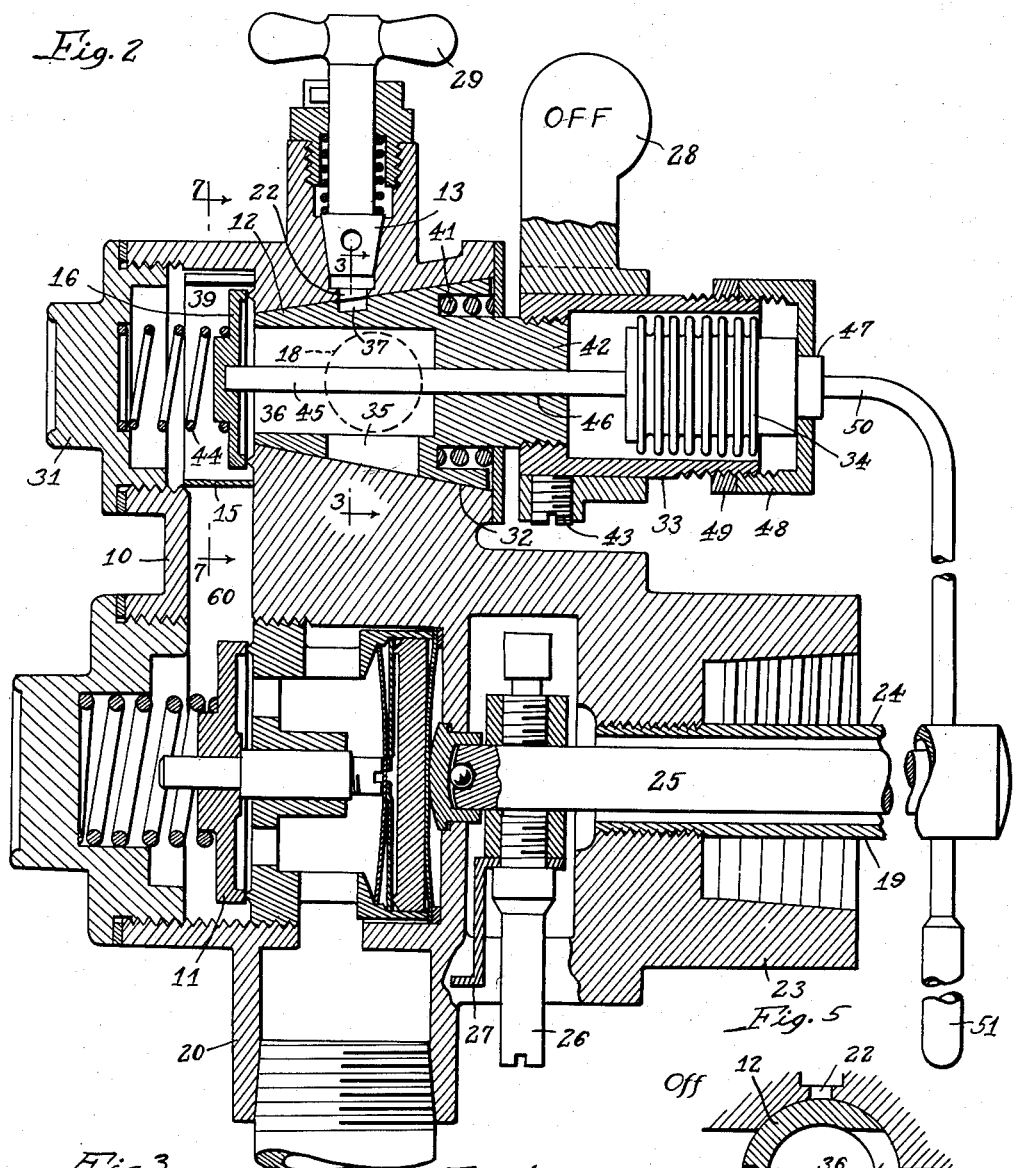

Patented July 16, 1935

2,008,547

UNITED STATES PATENT OFFICE 2,008,547

SAFETY GAS VALVE

John H. Grayson, Lynwood, Calif., assignor to Grayson Appliance Co., Ltd., Lynwood, Calif., a corporation of California Application September 10, 1934, Serial No. 743,327

20 Claims. (Cl. 236—21)

This invention relates to gas valves, and more particularly safety pilot cocks, applicable to gas appliances generally.

The principal object of the present invention is to provide a safety pilot cock incorporated in a thermostatically controlled gas valve adapted for use with water heaters but capable of use with other gas appliances. It has been customary in the past to provide a separate shut-off cock at a convenient point in the gas line running to or from the thermostatic valve, but that required too many connections, which, besides being costly, gave rise to danger of gas leakage. In accordance with the present invention, I incorporate the safety valve in the shut-off cock to form a safety pilot cock and combine this cock with the thermostatic valve in one body, whereby to cut down the number of connections to an absolute minimum, and make for compactness of construction, neatness in appearance, and all around economy. The cock is furthermore embodied in the valve in such a way that accurate and economical machining is facilitated.

Another important object is to provide an improved safety pilot gas cock with a view to providing for total shut-off of gas, that is, to the pilot burner as well as the main burner, and more compactness and ease in assembling, as well as greater dependability in operation.

A salient feature of the safety cock of my invention is the prevention of a bellows or other temperature responsive expansible-contractible unit having a highly flexible capillary tube extending therefrom and arranged to be placed so that the bulb provided on its remote end will be heated by the pilot flame. This greatly facilitates installations and renders the invention practically universally adaptable.

The invention is illustrated in the accompanying drawings, in which—

Figure 1 is a rear view of a thermostatic gas valve embodying my invention;

Fig. 2 is a longitudinal section on the line 2—2 of Fig. 1, showing how the safety pilot cock has been incorporated to obtain the utmost compactness;

Fig. 3 is a sectional detail on the line 3—3 of Fig. 2, showing the cock in "Start" position;

Figs. 4 and 5 are similar sections showing the cock in "On" and "Off" positions, respectively;

Fig. 6 is a sectional detail of the pilot adjustment valve taken on the line 6—6 of Fig. 1;

Fig. 7 is a sectional detail of the pressure adjustment valve taken on the line 7—7 of Fig. 2;

Fig. 8 shows an independent safety pilot gas cock made in accordance with this invention, the same being similar in construction to that incorporated in the valve of Fig. 2, as is evidenced from Fig. 9, and Fig. 9 is a longitudinal section through the safety pilot gas cock taken on the line 9—9 of Fig. 8.

Similar reference numerals are applied to corresponding parts throughout the views.

Referring first to Figs. 1 to 7, the thermostatically controlled gas valve herein shown is similar in certain respects to that disclosed in my copending application Serial No. 682,785, filed July 29, 1933; it comprises a body or casing 10 in which are incorporated a thermostatic valve 11 like that of said application, shut-off cock 12, pilot cock 13, and pilot adjustment valve 14. Also incorporated are a flame adjusting restriction valve 15, adjustable as hereinafter described according to the pressure of the gas in the main supply line, and a safety valve 16, with which the present invention is especially concerned. Gas is supplied from the main through inlet connection 17 communicating with port 18. The shut-off cock 12 and safety valve 16 together constitute the safety pilot cock for controlling the flow of gas from port 18 to the snap-action thermostatic valve 11. The extent of flow is determined by the adjustment of valve 15. The valve 11 is opened and closed according to the cooling and heating of a thermostat 19, and, under normal operating conditions, when the valve 11 is opened, gas is discharged through outlet connection 20 to the main burner of the water heater or other gas appliance in connection with which the valve is used. The tube 21 extends to the pilot burner for the main burner and communicates with the pilot port 22 when the pilot cock 13 is opened. One may regulate the size of the pilot flame by means of the pilot adjustment valve 14. The device is arranged to be mounted on the wall of the tank of a water heater by means of boss 23, with the thermostat 19 extending into the tank to be affected by the temperature of the water. The thermostat 19 consists of a tube 24 and rod 25, the former of copper or other material having a high coefficient of expansion, and the latter of invar or any other suitable material substantially free from expansion and contraction with temperature change. The rod 25, as described in the other application, is threadedly adjusted with respect to the tube 24 when turned by means of a lever 26 fastened onto the inner end of the rod. As the rod is turned, a pointer 27 is moved relative to a temperature scale on the body 10 so as to indicate the temperature setting.

It is apparent from the above description that a valve embodying the six features, numbered 11 to 16, all in the one body 10, has many advantages over the old constructions, not only from the standpoint that the number of pipe connections is reduced to a minimum, despite the addition of a safety pilot gas cock, but also from the standpoint of the handiness with which the operator can manipulate the various parts. Thus, the handles 28 and 29 are both on the one valve, the handle 28 serving to turn the shut-off cock 12, and the handle 29 serving to turn the pilot cock 13, whereby gas may be turned on or off for the main burner and pilot burner. It is also quite convenient for the operator to adjust the pilot flame by means of the valve 14, which is accessible upon removal of cap 30. The restriction valve 15, which is more or less permanently adjusted at the time the appliance is installed, is also readily accessible upon removal of the cap 31. The safety valve 16 is also accessible upon removal of cap 31 for cleaning or inspection. Considering the number of devices built into the one valve, including, as stated before, a safety pilot cock, the present device is extremely compact, and it presents a neat and attractive appearance on the heater or other gas appliance on which the same is installed.

In accordance with the present invention, the shut-off cock 12, which is tapered, as shown, is entered in a tapered bore 32 in body 10, substantially parallel to the longitudinal axis of valve 11 and thermostat 19. This relationship makes for the best compactness obtainable, taking into consideration the fact that the cock 12 has the handle 28 projecting from the body and the housing 33 for bellows 34 projects still farther, and capillary tube 35 projects from said housing. In other words, this assembly, which is necessarily somewhat elongated, is arranged in a line extending in the general direction of the major dimension of the other and larger port of the device—the thermostatic valve 11. The coaxial or concentric relationship of cock 12, valve 16, and expansible-contractible bellows 34 also makes for utmost compactness, and their direct connection or association which will now be described results in extreme compactness, as well as low cost and dependability.

The cock 12 has a large circular radial port 35 intended for registration with inlet port 18 to deliver gas to the bore 36 of said cock. An arcuate groove 37 in the outer periphery of the cock is arranged to establish communication between inlet port 18 and pilot port 22, as in Fig. 3, or between port 22 and a port 38, as in Fig. 4. Port 38 communicates with safety chamber 39 of valve 16, by way of passage 40 (Fig. 7). Now, the cock 12, which is held seated by pressure of spring 41, to avoid gas leakage, has the housing 33 fixed on the projecting end 42 thereof, as by threading, and the handle 28 is fixed on the housing by a set screw 43, whereby to permit turning the cock by hand to either one of three positions shown in Figs. 3–5. The bore 36 communicates with safety chamber 39 whenever the safety valve 16 is open. This valve is normally held closed by a compression spring 44 in the safety chamber 39, bearing against cap 31. A push-rod 45 extends from the valve through the bore 36 of the cock 12 and through a guide 46 in the rear end of the cock to the bellows 34 in housing 33. The bellows is swivelled at 47 in a cap 48 adjustably threaded on the housing 33 and locked by nut 49. The housing 33 turns with the handle 28 and cock 12, without any accompanying revolution of the bellows 34; the bellows as well as its tube 50, rod 45, and valve 16 are unaffected by the turning of the cock 12. The tube 50 is a flexible capillary tube and extends from the bellows as shown and terminates in a bulb 51, adapted to be placed in proximity to the pilot burner, so as to cause expansion of an expanding fluid medium, with which the bellows, tube, and bulb are filled, and thereby expand the bellows and open the valve 16.

In operation, the shut-off cock 12 is first in the "Off" position of Fig. 5, with the handle 28 horizontal so that the word "Off" cast on one side thereof is visible on top. No gas can flow to either the main burner or pilot burner, under these conditions. To light the water heater or other appliance, it is first necessary to light the pilot burner. The cock 12 is therefore turned to "Start" position (Fig. 3) by moving the handle 28 through 90° to the vertical position shown in Fig. 2. Under these conditions the port 35 is still cut off from any communication, but gas is delivered to the pilot burner through groove 37, from port 18 to the tube 21, which extends to the pilot burner. The latter can therefore be lighted. Soon thereafter, when the bulb 51 has been heated sufficiently to expand the bellows 34 far enough to open the safety valve 16, the cock 12 is turned to the "On" position (Fig. 4) by moving the handle 28 through a further 90° to a horizontal position, diametrically opposed to its initial position, in which the word "On", cast on the other side of the handle, is visible on top. Under these conditions the port 35 is placed in full communication with inlet port 18, so that the main burner is supplied with gas through bore 36 of cock 12, past the open safety valve 16 and open thermostatic valve 11. The pilot burner, however, has its source of gas supply changed, because the groove 37 under these conditions (Fig. 4) establishes communication for pilot port 22 with the port 38, instead of port 18. The port 38 communicates with the safety chamber 39, which is on the opposite side of safety valve 16 from port 18. Therefore, if the valve 16 is closed, the pilot burner is cut off from further gas delivery in the same way as the main burner. In other words, this is a 100% safety device, as distinguished from that type in which gas continues to flow to the pilot burner after it is extinguished accidentally, and only the main burner is shut off automatically by the closing of a safety valve. With the present construction it is apparent that whenever the bulb 51 associated with bellows 34 is allowed to get cold, as for example, if the pilot burner is extinguished by a sudden gust of air, while the main burner is off, the safety valve 16 will close under action of its spring 44 as soon as the contraction of bellows 34 permits, thus completely shutting off the gas to both burners until the appliance is relighted in the manner previously described. In passing, it will be seen by comparison of Figs. 3 and 4 that the switch-over of the pilot from port 18 to port 38, that is, from communication with one side of the safety valve to communication with the opposite side, is accomplished without danger of extinguishing the flame, because the main burner is assured of ignition before the pilot burner is cut off. In other words, the port 35 comes into register almost fully with port 18 before the groove 37 goes out of register with port 18, and then, an instant later, the groove 37 reestablishes supply connections for the pilot burner by throwing port 22 in communication with the safety chamber 39 by way of port 38 and passage 40.

With the safety valve incorporated in the thermostatic valve as above described, it is apparent that both valves are easily accessible for cleaning and inspection, simply by removing the caps associated therewith.

Figs. 8 and 9 show an independent safety pilot gas cock similar to that above described, adapted for various gas appliances such as gas-burning space heaters, gas stoves, gas-steam radiators, gas-fired furnaces, etc. This cock has its body 10' provided with an inlet connection 17' adapted for tapping into a gas supply manifold, and a jet or orifice 20' adapted to discharge directly, or otherwise, to a main burner. The tube 21' will extend to a pilot burner. The bulb 51' on capillary tube 50' is heated by the pilot flame as in the other device to expand bellows 34' and cause opening of safety valve 16'. The cock 12' is similarly operated by handle 28' to first allow lighting of the pilot burner so that the thermostatic control 34'—51' will secure opening of safety valve 16', whereupon the cock 12' is turned to its "On" position, as in the first described device. The advantages previously set forth in connection with the other device are also obtained in this device—it is of compact and simple construction, economical to produce, easy to install, and dependable in its operation. In both devices, it is apparent that the highly flexible capillary tube, which can be bent around any obstructions, greatly simplifies installation, and adapts the thermostatic valve, or safety pilot cock, as the case may be, to use on practically any appliance, it being an easy matter after installation of the valve or cock to extend the capillary tube wherever required. In other words, there are no special limitations imposed upon the design of an appliance in order to adapt it for use with the device of my invention.

Referring again to Figs. 2 and 7, the adjustable restriction valve 15 is of sheet metal made C-shaped in cross-section as appears in Fig. 7, and having a snug working fit inside the safety chamber 39. It is more than 180° in angular extent, as shown, so that it will retain its position on the side wall of the chamber, and it is arranged to be moved by hand to a position cutting off more or less of the connecting passage 60 from communication with the safety chamber 39, depending upon how high or low the gas pressure in the line happens to be, the object being to set each appliance at the time of installation so that it will operate most economically and efficiently under the existing service conditions.

It is believed the foregoing description conveys a good understanding of the objects and advantages of my invention. The appended claims have been drawn so as to cover all legitimate modifications and adaptations.

I claim:

1. In a gas valve, the combination in a body having a main longitudinal bore provided therein between an inlet passage and an outlet passage together with a valve for controlling the flow of gas from the inlet to the outlet passage, a secondary longitudinal bore provided in said body in spaced substantially parallel relation to the first bore and communicating with the inlet passage, a cock rotatably mounted in said second bore having an L-shaped passage provided therein for communication with the passage through the end of the cock, said body having an opening communicating with the secondary bore and with the outer end of the L-shaped passage in the cock when the cock is turned in the bore to open position, said body being adapted to receive a conduit in said opening for conducting gas to said body, and being adapted to receive another conduit communicating with the outlet passage for conducting gas from said body.

2. A valve as set forth in claim 1, including a valve movable axially relative to said cock to control communication between the L-shaped passage of the cock and the inlet passage in said body.

3. A valve as set forth in claim 1, including a safety valve in the inlet passage movable axially relative to said cock toward and away from the end thereof so as to control communication between the L-shaped passage of the cock and the inlet passage of said body, and means for opening and closing said valve.

4. A valve as set forth in claim 1, including thermostatic means for opening and closing the valve in said main bore, a safety valve controlling communication between the secondary bore and the inlet passage, and independent thermostatic means for opening and closing the safety valve.

5. A valve as set forth in claim 1, including a valve movable axially relative to said cock to control communication between the L-shaped passage of said cock and the inlet passage in said body, spring means normally tending to close said valve, a push rod guided in said cock for endwise movement relative thereto to open said valve, an expansible-contractible thermostatic container mounted on the cock and arranged to operate said rod, and a capillary tube extending from the container to a normal source of heat, the tube and container containing an expansible medium sensitive to temperature change.

6. A valve as set forth in claim 1, including a poppet valve in the inlet passage relative to which said cock is arranged to be turned, said valve being movable axially relative to said cock to control communication between the secondary bore and the inlet passage, spring means normally tending to close said valve, a push rod extending lengthwise through said cock and guided for endwise movement relative thereto to open said valve, an expansible-contractible thermostatic container engaging the outer end of said rod to move the same, a flexible capillary tube fixed to and extending from said container to a normal source of heat, the tube and container containing an expansible medium sensitive to temperature change, and housing means on said cock enclosing said container and providing a swivel abutment therefor, whereby said cock is arranged to be turned relative to said container.

7. In a gas valve, the combination in a body having a main longitudinal bore provided therein between an inlet passage and an outlet passage together with a valve for controlling the flow of gas from the inlet to the outlet passage, a secondary longitudinal bore provided in said body in spaced substantially parallel relation to the first bore and communicating with the inlet passage, the second bore being smooth and tapered, a tapered cock rotatable in said bore and having an L-shaped passage provided therein for communication with the inlet passage in said body through the end of said cock, said body having an inlet opening communicating with the side of the tapered bore arranged to communicate with the other end of the L-shaped passage in the cock when the cock is turned to open position, said body being adapted to receive a conduit in said opening for conducting gas to said body, and being adapted to receive another conduit communicating with the outlet passage for conducting gas from said body.

8. In a gas valve, the combination in a body having a main longitudinal bore provided therein between an inlet passage and an outlet passage together with a valve for controlling the flow of gas from the inlet to the outlet passage, a secondary longitudinal bore provided in said body in spaced substantially parallel relation to the first bore and communicating with the inlet passage, a cock rotatably mounted in said bore having an L-shaped passage provided therein for communication with the passage through the end of the cock, said body having a main opening communicating with the side of said secondary bore arranged to communicate with the other end of the L-shaped passage in the cock when the cock is turned to open position, said opening being adapted to receive a conduit for conducting gas to said body, said body having a secondary opening communicating with the side of said secondary bore in angularly spaced relation to the main opening, said secondary opening being adapted to receive a conduit for conducting gas from said body, said cock having a groove provided in the periphery thereof arranged in one position of the cock to establish communication between the inlet opening and said secondary opening, there being a passage provided in said body communicating at one end with the inlet passage and communicating at the other end with the side of said secondary bore at a point in angularly spaced relation to the secondary opening, the aforesaid groove being adapted in another position of the cock to establish communication between the last-mentioned passage and the secondary opening, and a valve in the inlet passage controlling communication between the secondary bore and the inlet passage.

9. A valve as set forth in claim 8, including manually operable means for turning the cock from one position to another, and independent thermostatically operated means for operating the last-mentioned valve, said thermostatic means being responsive to heat from a source with which the secondary port is arranged to communicate.

10. In a gas valve, the combination in a body having a main longitudinal bore provided therein between an inlet passage and an outlet passage together with a valve for controlling the flow of gas from the inlet to the outlet passage, a secondary longitudinal bore provided in said body in spaced substantially parallel relation to the first bore and communicating with the inlet passage, a cock rotatably mounted in said bore having an L-shaped passage provided therein for communication with the passage through the end of the cock, said body having an opening communicating with the secondary bore and with the outer end of the L-shaped passage in the cock when the cock is turned in the bore to open position, said body being arranged to have gas supplied thereto through the last-mentioned opening, a safety valve controlling communication between the L-shaped passage in said cock and the inlet passage in said body, thermostatic means responsive to the heat of a determining source arranged to operate said valve, and a manually adjustable restriction valve for regulating the flow of gas through the inlet passage.

11. A valve as set forth in claim 1, wherein said body is formed to provide a circular safety chamber therein at one end of the inlet passage substantially concentric with the secondary bore and communicating therewith, the valve including a poppet-type safety valve in said chamber controlling communication between said bore and chamber, thermostatic means for opening and closing said valve in accordance with the thermal condition of a determining heat source, and a manually adjustable restriction valve rotatable in substantially concentric relation to the safety valve adjustable circularly in said safety chamber to regulate the flow of gas to the inlet passage.

12. In a safety pilot gas cock, the combination in a body having a bore therein, a cock rotatably mounted in said bore having an L-shaped passage provided therein opening at the one end of said cock and at one side thereof, said body having an opening communicating with said bore and with the passage in the cock when the latter is turned to open position, said body having a chamber therein communicating with the other end of the passage in the cock, a safety valve in said chamber movable axially relative to said cock toward and away from the end thereof to control communication between said L-shaped passage and said chamber, and means for opening and closing said valve, the aforesaid opening in said body being adapted to receive a conduit for conducting gas to said body, and said chamber serving as an outlet for discharge of gas from said body.

13. In a safety pilot gas cock, the combination in a body having a bore therein, a cock rotatably mounted in said bore having an L-shaped passage provided therein opening at the one end of said cock and at one side thereof, said body having an opening communicating with said bore and with the passage in the cock when the latter is turned to open position, said body having a chamber therein communicating with the other end of the passage in the cock, a safety valve in said chamber movable axially relative to said cock toward and away from the end thereof to control communication between said L-shaped passage and said chamber, spring means normally tending to close said valve, a push rod guided in said cock for endwise movement relative thereto to open said valve, an expansible-contractible thermostatic container mounted on the cock and arranged to operate said rod, and a capillary tube extending from the container to a normal source of heat, the tube and container containing an expansible medium sensitive to temperature change.

14. In a safety pilot gas cock, the combination in a body having a bore therein, a cock rotatably mounted in said bore having an L-shaped passage provided therein opening at the one end of said cock and at one side thereof, said body having an opening communicating with said bore and with the passage in the cock when the latter is turned to open position, said body having a chamber therein communicating with the other end of the passage in the cock, a safety valve in said chamber movable axially relative to said cock toward and away from the end thereof to control communication between said L-shaped passage and said chamber, spring means normally tending to close said valve, a push rod extending lengthwise through said cock and guided for endwise movement relative thereto to open said valve, an expansible-contractible thermostatic container engaging the outer end of said rod to move the same, a flexible capillary tube fixed to and extending from said container to a normal source of heat, the tube and container containing an expansible medium sensitive to temperature change, and housing means on said cock enclosing said container and providing a swivel abutment therefor, whereby said cock is arranged to be turned relative to said container.

15. In a safety pilot gas cock, the combination in a body having a bore therein, a cock rotatably mounted in said bore having an L-shaped passage provided therein opening at the one end of said cock and at one side thereof, said body having a main opening communicating with said bore and with the passage in the cock when the latter is turned to open position, said body having a chamber therein communicating with the other end of the passage in the cock, said opening being adapted to receive a conduit for conducting gas to said body, said body having a secondary opening communicating with the side of said bore in angularly spaced relation to the main opening, said secondary opening being adapted to receive a conduit for conducting gas from said body, said cock having a groove provided in the periphery thereof arranged in one position of the cock to establish communication between the inlet opening and said secondary opening, there being a passage provided in said body communicating at one end with the aforesaid chamber and communicating at the other end with the side of said bore at a point in angularly spaced relation to the secondary opening, the aforesaid groove being adapted in another position of the cock to establish communication between the last-mentioned passage and the secondary opening, a safety valve in said chamber movable axially relative to said cock toward and away from the end thereof to control communication between said L-shaped passage and said chamber, and means for opening and closing said valve, the aforesaid opening in said body being adapted to receive a conduit for conducting gas to said body, and said chamber serving as an outlet for discharge of gas from said body.

16. A cock as set forth in claim 15, including manually operable means for turning the cock from one position to another, and independent thermostatically operated means for operating the last-mentioned valve, said thermostatic means being responsive to heat from a source with which the secondary port is arranged to communicate.

17. In a safety pilot gas cock, a body having a longitudinal bore, a cock rotatable therein having an open discharge end and the opposite end closed, said body providing a chamber arranged to communicate with the open end of said cock, a spring-closed poppet valve in said chamber movable toward the end of said cock to close off communication with the chamber, said chamber serving as an outlet for discharge of gas from the body, said body having an opening in the side thereof adapted to have gas supplied thereto and through a registering opening in the side of said cock for discharge through the open end of said cock, a handle on the closed end of said cock for turning the same from one position to another, a housing also turning with said cock and handle, a thermostatic bellows in said housing swivelled relative to the end wall thereof whereby to permit turning of the cock independently of the bellows, a push rod extending longitudinally through a guide in said cock to open the valve by means of the bellows when it expands, and a capillary tube extending from said bellows to a source of heat, the tube and bellows containing an expansible medium sensitive to temperature change.

18. A device as set forth in claim 17 wherein said capillary tube is flexible and arranged to be extended laterally from the cock in transverse relation to its axis of rotation.

19. In a safety pilot gas cock, a body having a bore terminating in a chamber, a rotary cock in said bore, gas discharge means supplied from said chamber, gas supply means communicating with the side of said cock, said cock having an open end arranged to discharge into the chamber, spring biased valve means in the chamber to close said open end, and thermostatic means on the other end of said cock having an operating connection with said valve means through said cock to open the same.

20. In a safety pilot gas cock, a body having a bore terminating in a chamber, a rotary cock in said bore, gas discharge means supplied from said chamber, gas supply means communicating with the side of said cock, said cock having an open end arranged to discharge into the chamber, spring biased valve means in the chamber to close said open end, a thermostatic bellows mounted on the other end of said cock so as to permit turning of said cock independently of the bellows, said bellows having a flexible capillary tube extending therefrom to a remote point relative to the body, the tube and bellows containing an expanding medium sensitive to temperature change, and means extending axially through the cock from the bellows to the valve means for opening the same upon expansion of the bellows.

JOHN H. GRAYSON.